Patented Feb. 3, 1931

1,790,907

UNITED STATES PATENT OFFICE

WILLIAM H. ENGELS, OF RAHWAY, NEW JERSEY, ASSIGNOR TO MERCK & CO., OF NEW YORK, N. Y., A CORPORATION OF NEW YORK

PROCESS FOR PREPARING ABSOLUTE ALCOHOL AND COMMERCIALLY-PURE POWDERED HYDRATED LIME

No Drawing.   Application filed July 5, 1927.   Serial No. 203,679.

This invention relates to new and useful improvements in the process of making a substantially dehydrated alcohol, especially ethyl alcohol, from commercial grades containing more or less water. The particular object is to produce a substantially absolute alcohol by a simple, effective, and economical process with the use of calcium oxide. Another object of the invention is to produce simultaneously as a by-product, substantially hydrated lime commercially pure and suitable for use in the building trades and otherwise. The new process is also intended to give a practically theoretical yield from all the materials taken into operation. A further object of the invention is to produce the hydrated lime in the form of a very fine powder requiring no further pulverization, and in a form ready for immediate employment in industry and agriculture.

Quick lime as a dehydrating agent for ethyl alcohol was first recommended for laboratory purposes by Soubeiran (1839) and later by Mendelejeff (1865) and Erlenmeyer (1871). However, this process was not always applied with complete success, and it necessitated reinvestigations as for instance by Crismer (1904), Kailan (1908), Andrews (1908), Warren (1910), Danner and Hildebrand (1922), and Noyes (1923) to prove that absolute alcohol may be obtained, at least in the laboratory, by treatment of alcohol of the usual commercial strength (about 92–93% by weight) with quick lime.

On a commercial scale it has heretofore not been possible to obtain an alcohol that could be considered practically 100% anhydrous by treating hydrous alcohol with lime. The so-called "absolute" alcohol of commerce is rarely stronger than 99%.

The process for obtaining absolute alcohol by such treatment with lime, as practiced heretofore, is not altogether efficient and at best, is wasteful, as indicated by the fact that it is not possible to obtain on the market a substantially anhydrous alcohol and that such so-called "absolute" alcohol commands a relatively high price.

There is an increasing demand in the industries for a practically 100% anhydrous alcohol of low cost and, the lime method, as heretofore applied, having failed, a number of other processes purporting to produce a 100% anhydrous alcohol have been developed and recommended during the last few years. A number of patents have been issued in this country and in foreign lands for various of such new processes as improvements over the older methods. Some of these processes depend on other dehydrating agents, some make use of a change in the relative boiling points of alcohol and water through the admixture of other volatile substances, like benzene or gasoline for instance, with resort also to suitable variations of the pressure under which the mixtures are distilled, and some use combinations of these methods.

Acting on the view that since lime is the cheapest and simplest dehydrating agent available for the purpose and that approximately perfect results have been shown to be attainable in the laboratory at least, through repeated operations, I came to the conclusion that it should be feasible to so perfect the process as to procure more satisfactory results in a commercial way, and that a successful commercial process based on the use of lime should have an advantage over the other newer and more complicated processes requiring more expensive materials, apparatus, and treatment.

In reviewing the work done by the above mentioned authors, I found that Noyes (J. A. Ch., 1923, p. 860) recommends the use of powdered lime, refluxing for an adequate length of time, and to carry out the process in three steps yielding 99%, 99.7% and 100% alcohol respectively in the successive steps.

Danner and Hildebrand (J. A. Ch. 1922, p. 2827) first reflux their alcohol for 8 hours and then, after cooling to room temperature, shake for from 24 to 36 hours, and finally distill onto a specially prepared powdered lime from which, after renewed refluxing, they obtain substantially 100% alcohol.

Warren (J. A. Ch., 1910, p. 700) uses, as probably did all previous investigators, lime in small pieces, refluxes for several hours, and repeats the operation a second time. The product, however, does not seem to have been of the highest concentrations.

Andrews (J. A. Ch., 1908, p. 355), after digesting commercial alcohol with quick lime for three weeks at room temperature under frequent stirring, obtains on distillation 99% alcohol.

Kailan (Centr. Bl. 1907 II p. 1489) refluxes for several hours with a large excess of lime and obtains alcohol of 99.9% strength.

To summarize: While, so far as the literature discloses, various authors have obtained dehydrated alcohol by the lime method which was nearly 100% anhydrous, their various modifications of the process do not lend themselves to an economical operation on a commercial scale, without further development. All of them use either a very large excess of lime (in some instances 200 and 300% excess) or resort to repeated treatments to obtain alcohol of the highest strength. The yields, too, are not commercially satisfactory, being, in the best case (Noyes), about 95%, and sinking, as reported by Warren, to about 70% of theory.

With one or two exceptions all of the reported processes rely on the ebullition during the refluxing period for bringing the lime in sufficiently intimate contact with the water contained in the alcohol. The larger a batch is made the less effective is this means for bringing about the complete interaction between the water and the lime. Only Danner and Hildebrand and, in a measure, Andrews, recommend a mechanical agitation by shaking the mixture at room temperature after a previous refluxing period. All the older investigators seem to have used quick lime in lump form or as a coarse powder. Danner and Hildebrand were the first to recommend a finely divided calcium oxide (prepared by their special method) for taking out the last traces of water.

Due to the large excess of lime used and also to its coarseness, the residue from distilling off the alcohol (provided this distillation was complete) consists of a caked mass of calcium hydroxide mixed with varying quantities of coarse particles of calcium oxide. Such a mixture of hydrate and oxide of lime is of no direct commercial value for use in that form and requires a further grinding and hydrating process to convert it into a salable hydrated lime which is suitable for the building trades for instance.

I conjectured, on theoretical grounds, that it should be possible to produce a practically 100% anhydrous alcohol and a commercially satisfactory hydrate of lime by the now practically subordinated lime method if I would properly control the quantities, the materials used, and the process in certain important particulars.

I found in my experiments that, if I used a moderate excess of lime over the theoretical quantity, calculated for the water content of the alcohol to be dehydrated, I could recover practically all the alcohol taken in process in substantially anhydrous form, and that the lime could be recovered in thoroughly hydrated form, except for the small excess of the lime put into process to insure the completeness of the alcohol dehydrating reaction. It became clear to me then that the failure of the lime method, as heretofore employed, in giving satisfactory yields, both as to quality and quantity, in the commercial application of the process, was due to the fact that the physical conditions which dominate this reaction had not been correctly understood and applied and that for this reason a closer approximation to the theoretically possible result had never been fully realized.

The process, as is known, is based on the chemical reaction

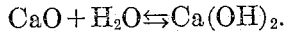
$$CaO + H_2O \rightleftharpoons Ca(OH)_2.$$

At room temperature, and at that of boiling alcohol, equilibrium is reached when but the merest trace of water is left in the alcohol (provided that a sufficient quantity of calcium oxide is present). Calcium oxide being practically insoluble in strong alcohol, the reaction between water and oxide may take place only on the surface of the oxide particles. The smaller the particles, the greater will be the surface exposed, and consequently the more rapid the interaction between oxide and water. A finely powdered lime seemed best suited for the process. The calcium hydroxide formed during the interaction is also practically insoluble in strong alcohol and, therefore, soon forms an impenetrable surface film on the oxide. The ebullition of the alcohol during the refluxing period will not remove this film sufficiently, which, hence, necessitates using a large excess of oxide. The necessary surface exposure of the oxide to the hydrated alcohol can, however, be brought about without having to resort to large excesses of lime, by an efficient stirring device to constantly remove the hydrate film from the oxide particles.

In working out the process, I therefore applied a stirring device which operates constantly, not only during the refluxing period, but also during the progress of the final distillation step. This constantly removes the surface film through the rubbing action of the particles on each other during the agitation. I found also that in thus continuously agitating the lime mass, that it was not necessary to reduce the calcium oxide taken into process to as great a degree of fineness as theory seemed to require, but that a coarse granular form would suffice every purpose, since the constant removal of the hydrate film gradually reduces the size of the granules and thus exposes new surfaces of oxide to the alcohol, gradually and progressively reducing the coarse particles to a remarkable degree of fineness. The constant and continued stirring serves also two other important purposes in this process. During the distilling off period it brings eventually, all parts of the mixture in contact with the heated surface of the distilling apparatus and, thereby, facilitates the complete recovery of all the alcohol present adsorbed to the lime. At the same time it prevents caking of the hydrated lime and the latter is obtained as a finely divided, even an impalpable, powder in the form in which it is directly available for the building trades and for fertilizing purposes as stated.

Due to the agitation of the lime under these conditions, the reaction is so accelerated that the heat of reaction causes such a considerable and rapid increase of temperature that it is necessary to proceed cautiously with the external heating to avoid excessive ebullition.

By observing closely all the conditions which I developed on theoretical grounds I found that I could produce a practically completely dehydrated alcohol and a highly commercially pure hydrated lime in the form of very fine powder,—finer even than can ordinarily be produced by the usual grinding methods,—on a large commercial scale in one operation and using only a comparatively slight excess of lime. The alcohol obtained is between 99.9 and 100% anhydrous. The commercially pure calcium hydroxide thus resulting as a side-product is immediately adaptable for the purposes of the building trades and for fertilizing.

To illustrate my method I give the following example: 2000 lbs. of ethyl alcohol, 92% by weight, and 600 lbs. of granular lime of about 95% CaO content are placed in a horizontal steam-jacketed still provided with a horizontal agitator (capable of keeping the powdered lime in motion even when no liquid is present). The batch is heated for four to six hours under a reflux condenser. The distilling head is then connected with a downgoing condenser and the alcohol distilled off completely under continued agitation of the now hydrated lime. From the quantities of the material used, 1830 lbs. of absolute alcohol are obtained, containing less than 0.10% of water. During the process the hydrated lime becomes finely powdered under the continued effect of the reaction and the stirring. The hydrated lime remaining in the still contains a small quantity of unconverted oxide. This latter is then converted into the hydrate by introducing, into the apparatus, while still hot, 25 lbs. of water. The agitation is continued throughout until all the water is completely absorbed and combined, which result can be noted by the reduction of the pressure in the still. The yield of hydrated lime, almost in form of dust, will be about 790 lbs.

Although the description of process has been specifically directed to the dehydration of pure ethyl alcohol, it is obvious that the process may also be applied to other related alcohols, as well as to various forms of denatured ethyl alcohol, within limitations which will be readily understood.

Alcohol of practically any strength within reasonable limits can be similarly treated by simply adding corresponding quantities of lime sufficient to combine with the calculated water present.

While I have specified a horizontal still in the above example I do not consider this to be an essential part of my invention, but any other form of still may be used for the purpose, if it is provided with a sufficiently powerful agitator and if it can be heated sufficiently to allow the removal of the last traces of alcohol from the hydrated lime. It is also possible to use a revolving drum, with or without an agitator, as in this case the motion of the still body provides for sufficient agitation of the materials. Obviously also other various minor modifications may be made, as for instance conducting the process under pressure, without departing from the spirit and scope of my invention.

The process as described naturally need not be carried to the point of extreme dehydration, according to the uses to which the alcohol is to be put. Even for the production of lower strengths, say between 95 to 99, the process has its technical and economic advantages in its simplicity, reduced manufacturing cost, and the concomittant production of the hydrated lime.

What I claim as new, and for which I pray the issuance of Letters Patent, is included in the following claims:

Claims.

1. The process of simultaneously producing substantially dehydrated alcohol and commercially pure substantially hydrated lime, comprising the following steps: mixing hydrous alcohol with a quantity of calcium oxide somewhat in excess of the theoretical quantity necessary for complete dehydration of the given alcohol and in comminuted form; heating the mixture in a still under a reflux condenser for from four to six hours under constant agitation of the entire mass of calcium oxide to be hydrated; distilling off the alcohol completely under the continued agitation of the now hydrated lime; the addition of a calculated quantity of water sufficient to complete the hydration of the excess of calcium oxide added in the initial step of the process, continuing the heating and agitation of the mixture until the final step of hydration of the lime is fully completed.

2. The process of simultaneously producing substantially dehydrated ethyl alcohol and commercially pure substantially hydrated lime, comprising the following steps: mixing hydrous alcohol with a quantity of calcium oxide somewhat in excess of the theoretical quantity necessary for complete dehydration of the given alcohol and in comminuted form; heating the mixture in a still under a reflux condenser for from four to six hours under constant agitation of the entire mass of calcium oxide to be hydrated; distilling off the alcohol completely under the continued agitation of the now hydrated lime; the addition of a calculated quantity of water sufficient to complete the hydration of the excess of calcium oxide added in the initial step of the process, continuing the heating and agitation of the mixture until the final step of hydration of the lime is fully completed.

3. The process for manufacturing ethyl alcohol containing less than $\frac{1}{10}$th of 1% of water, comprising the following steps: mixing hydrous alcohol of any commercial strength with powdered calcium oxide, in slight excess, in a horizontal steam-jacketed still, provided with a reflux condenser and a horizontal agitator of sufficient power to keep the quantity of granulated oxide in motion, even when no liquid is present; heating and agitating the batch substantially for from four to six hours under the reflux condenser; thereafter distilling off the alcohol completely under continued agitation of the remaining hydrated lime.

4. The process for simultaneously manufacturing ethyl alcohol containing not more than 0.1% of water, and substantially completely hydrated lime in the form of an impalpable powder, comprising the following steps: mixing hydrous alcohol of any commercial strength with granulated calcium oxide, in slight excess, in a horizontal steam-jacketed still provided with a reflux condenser and a horizontal agitator of sufficient power to freely agitate the quantity of granulated oxide even when no liquid is present; heating the batch for substantially from four to six hours under the reflux condenser and under constant agitation; thereafter distilling off the alcohol under continued agitation of the remaining substantially completely hydrated lime until all of the free and adsorbed alcohol has been driven off; and finally adding a quantity of water sufficient to hydrate any remaining excess of oxide, while the apparatus is still hot, still continuing the agitation until the hydration of such excess has been completed; substantially as described and for the purposes stated.

5. The process of simultaneously producing practically completely dehydrated alcohol and commercially pure hydrated lime, comprising the admixture of hydrous alcohol with a small excess of granulated calcium oxide in a still provided with a refluxing condenser, heating the mixture under the reflux condenser and constantly removing the film of hydrated lime as it forms upon the surface of the particles of oxide by agitating the mass during the refluxing period, continuing the refluxing until reaction is completed, thereafter distilling off the alcohol, continuing the distillation until all of the liquid and adsorbed alcohol has been carried over, continuously exposing fresh surfaces of the particles of the now substantially completely hydrated lime by agitation during the distillation.

6. The process of producing completely hydrated commercially pure calcium hydrate, as a by-product, in the form of an impalpable powder, comprising the treatment of calcium oxide, reduced to a granulated form (the quantity of the oxide being in slight excess with respect to the water contained in the alcohol) in a closed still provided with a reflux condenser and an agitator of sufficient power to efficiently agitate the given quantity of the solid material while in the dry state; heating the mixture for from four to six hours in a reflux condenser, then distilling off the alcohol and continuing the distillation process until all the liquid and the adsorbed alcohol are driven off from the remaining mass of lime; then adding a sufficient quantity of water to slake the remaining unslaked residue of calcium oxide, the heating and agitation being continued throughout the several steps of the process.

7. The process of dehydrating alcohols, comprising the mixing of a hydrous alcohol with comminuted calcium oxide in relatively small excess as to the amount of water to be removed; heating the mixture, refluxing, and constantly removing the film of hydrated lime as it forms upon the surface of the particles of oxide by mechanically agitating the lime mass during the refluxing period; continuing the refluxing and agitation until the reaction has been carried to completion and thereafter distilling off the treated alcohol under continued agitation.

8. The process of dehydrating ethyl alcohol, comprising the admixture of hydrous ethyl alcohol with comminuted calcium oxide in relatively small excess as to the amount of water to be removed; heating the mixture, refluxing, and constantly removing the film of hydrated lime as it forms upon the surface of the particles of oxide by mechanically agitating the lime mass during the refluxing period; continuing the refluxing and agitation until the reaction has been carried to completion and thereafter distilling off the treated alcohol under continued agitation.

WILLIAM HENRY ENGELS.